United States Patent
Tong et al.

(10) Patent No.: US 12,107,485 B2
(45) Date of Patent: Oct. 1, 2024

(54) PERMANENT MAGNET MOTOR WITH AIR AND WATER MIXED COOLING SYSTEM

(71) Applicant: SHENYANG UNIVERSITY OF TECHNOLOGY, Liaoning (CN)

(72) Inventors: Wenming Tong, Liaoning (CN); Shengnan Wu, Liaoning (CN); Fengge Zhang, Liaoning (CN); Hongkui Zhang, Liaoning (CN); Jianguo Jia, Liaoning (CN)

(73) Assignee: Shenyang University of Technology, Shenyang (CN)

( * ) Notice: Subject to any disclaimer, the term of this patent is extended or adjusted under 35 U.S.C. 154(b) by 0 days.

(21) Appl. No.: 18/395,491

(22) Filed: Dec. 23, 2023

(65) Prior Publication Data

US 2024/0213852 A1    Jun. 27, 2024

(30) Foreign Application Priority Data

Dec. 27, 2022   (CN) .......................... 202211680595.0

(51) Int. Cl.
*H02K 9/193* (2006.01)
*H02K 1/278* (2022.01)
(Continued)

(52) U.S. Cl.
CPC ............ *H02K 9/193* (2013.01); *H02K 1/278* (2013.01); *H02K 3/28* (2013.01); *H02K 3/48* (2013.01); *H02K 5/203* (2021.01); *H02K 9/10* (2013.01)

(58) Field of Classification Search
CPC .......... H02K 9/19; H02K 9/193; H02K 9/197; H02K 9/02; H02K 9/04; H02K 9/06;
(Continued)

(56) References Cited

U.S. PATENT DOCUMENTS

2015/0028727 A1* 1/2015 Watanabe ............ H02K 1/2706
310/60 A

FOREIGN PATENT DOCUMENTS

| CN | 102983680 A | 3/2013 |
| CN | 103545948 A | 1/2014 |

(Continued)

OTHER PUBLICATIONS

First Office Action for China Application No. 202211680595.0, mailed Apr. 8, 2023.
(Continued)

*Primary Examiner* — Tulsidas C Patel
*Assistant Examiner* — Robert E Mates
(74) *Attorney, Agent, or Firm* — Pilloff Passino & Cosenza LLP; Rachel K. Pilloff; Sean A. Passino

(57) ABSTRACT

A permanent magnet motor with a high-efficiency air-water mixed cooling system is provided. An inner circumference of a stator core of the permanent magnet motor is provided with multiple stator slots along a circumferential direction, armature windings are arranged in the stator slots, an outer circumference of the stator core is provided with multiple axial ventilation channels along an axial direction and a radial ventilation channel along a radial direction. The radial ventilation channel is communicated with the axial ventilation channels and contacts with a rotor core. Stator water-cooling discs are arranged at both ends of the stator core. A casing is provided with an air inlet communicated with the radial ventilation channel, multiple air outlets communicated with the axial ventilation channels, casing water-cooled water inlets and casing water-cooled water outlets. The casing water-cooled water inlets and the casing water-cooled water outlets are both communicated with the stator water-cooling discs.

5 Claims, 9 Drawing Sheets

(51) Int. Cl.
*H02K 3/28* (2006.01)
*H02K 3/48* (2006.01)
*H02K 5/20* (2006.01)
*H02K 9/10* (2006.01)

(58) Field of Classification Search
CPC .. H02K 9/08; H02K 9/10; H02K 9/12; H02K 9/14; H02K 1/20; H02K 3/24; H02K 3/28; H02K 3/48; H02K 5/20; H02K 5/203; H02K 5/207
See application file for complete search history.

(56) References Cited

FOREIGN PATENT DOCUMENTS

| | | |
|---|---|---|
| CN | 106451864 A | 2/2017 |
| CN | 107147260 A | 9/2017 |
| CN | 112688491 A | 4/2021 |
| CN | 112803635 A | 5/2021 |
| JP | 2002051503 A | 2/2002 |

OTHER PUBLICATIONS

Notification to Grant Patent for China Application No. 202211680595.0, mailed May 29, 2023.
First Search Report for China Application No. 202211680595.0, dated Apr. 7, 2023.
Supplementary Search Report for China Application No. 202211680595.0, dated May 24, 2023.

\* cited by examiner

PERMANENT MAGNET MOTOR WITH AIR AND WATER MIXED COOLING SYSTEM

CROSS-REFERENCE TO RELATED APPLICATIONS

This application claims priority of Chinese Patent Application No. 202211680595.0, filed on Dec. 27, 2022, the entire contents of which are incorporated herein by reference.

TECHNICAL FIELD

The disclosure belongs to the technical field of permanent magnet motor cooling, and particularly relates to a permanent magnet motor with a high-efficiency air-water mixed cooling system.

BACKGROUND

High-power motors are mainly used in petroleum and petrochemical, water conservancy and hydropower, shipbuilding and other industries. High-power density is main development direction of the high-power motors. The temperature rise problem inside motors hinders the development of high power of the motors. Excessive temperature rise leads to irreversible demagnetization of a permanent magnet, and the life of insulating materials may be shortened sharply, which is not conducive to the safe and reliable operation of motors.

At present, the cooling technology of permanent magnet motor with high-power density mainly adopts forced air cooling through single casing water cooling, self-fan cooling or externally connected blower. Although the casing water cooling may cool the stator by directly contacting the stator core through the casing water channel, the heat on the rotor is difficult to dissipate. Self-fan cooling drives the air inside the motor to flow quickly through the fan blades rotating coaxially with the rotor, so as to strengthen the convection heat dissipation of the motor. However, the self-fan cooling method causes a lot of air friction loss to the motor. The cooling effect by the single externally connected blower is difficult to further improve the power density of the motor. In recent years, researchers have done a lot of research on deep cooling inside the motor, including various new composite cooling structures. Therefore, the research on high-efficiency cooling system has become the key to promote high-power density and light weight of the motor.

SUMMARY

The disclosure provides a permanent magnet motor with a high-efficiency air-water mixed cooling system. The permanent magnet motor has the air-water mixed cooling system with a radial ventilation structure, and aims to solve the shortcomings of the rotor heat dissipation technology of the existing permanent magnet motor with high-power density.

The present disclosure provides following technical scheme.

A permanent magnet motor with a high-efficiency air-water mixed cooling system includes a stator core, armature windings, a rotor core, a sheath, a permanent magnet, a rotating shaft and a casing. The rotating shaft is arranged with the rotor core, the permanent magnet is fixed on a surface of the rotor core, the sheath is fixed on a surface of the permanent magnet, the stator core is fixed on the casing, an air gap is provided between the stator core and the sheath, and end covers are installed at both ends of the casing and are closely attached to the casing by fixed means.

An inner circumference of the stator core is provided with multiple stator slots along a circumferential direction, the armature windings are arranged in the stator slots, an outer circumference of the stator core is provided with multiple axial ventilation channels along an axial direction, and the outer circumference of the stator core is provided with a radial ventilation channel along a radial direction, the radial ventilation channel is communicated with the axial ventilation channels, and the radial ventilation channel is in contact with the rotor core, and stator water-cooling discs are arranged at both ends of the stator core. The casing is provided with an air inlet, multiple air outlets, casing water-cooled water inlets and casing water-cooled water outlets. The air inlet is communicated with the radial ventilation channel, the plurality of air outlets are communicated with the axial ventilation channels, and the casing water-cooled water inlets and the casing water-cooled water outlets are both communicated with stator water-cooling discs.

Optionally, the armature windings are double-layer windings.

Optionally, the stator water-cooling discs are in a double parallel waterway structure, and the stator water-cooling discs are connected with an external circulating water-cooling system.

Optionally, the air inlet and the air outlets are both connected with an external blower, and a dust filter net is installed at the air inlet of the ventilation channel of the casing.

Optionally, a space of the armature windings account for 65% to 75% of in each of the stator slots, and a rest space is for in-slot air channels. The in-slot air channels accounts for 25% to 35%, and the in-slot air channels are communicated with the axial ventilation channels through the air gap.

Optionally, two air outlets are provided, and are a first air outlet and a second air outlet respectively. The first air outlet and the second air outlet are arranged on both sides of the air inlet, and sizes of openings of the first air outlet and the second air outlet are same.

The present disclosure has following beneficial effects.

Compare with the prior art, the permanent magnet motor according to the disclosure has the air-water mixed cooling structure with the radial ventilation structure, so that a part of the heat produced by the rotor may be directly taken away through directly contacting the surface of the rotor which is difficult to be cooled by cooling air. Compared with the traditional water-cooled motor which transfers heat through the casing, the permanent magnet motor in the present disclosure greatly improves the flow velocity inside the motor, increases the convective heat dissipation coefficient of the rotor, improves the heat transfer efficiency of the permanent magnet and the rotor core, and reduces the risk of irreversible demagnetization of the permanent magnet.

DETAILED DESCRIPTION OF THE EMBODIMENTS

Figure 1:
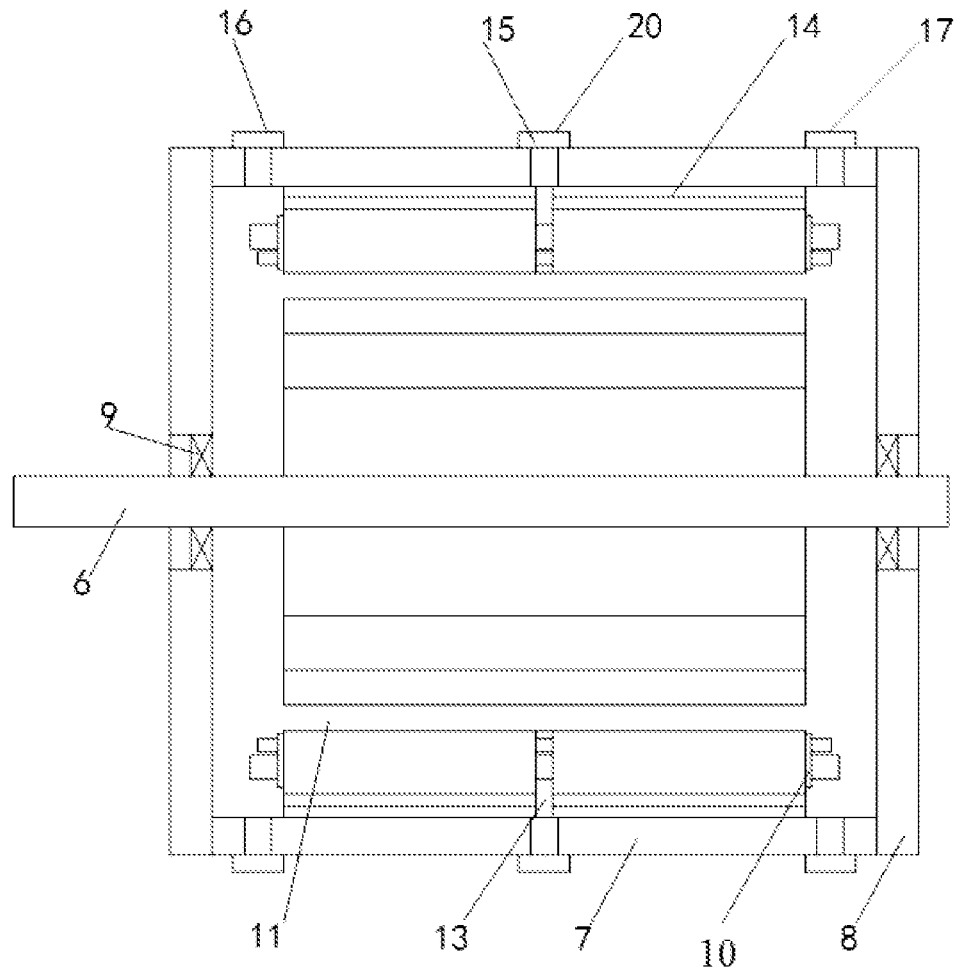
FIG. 1 is an axial sectional view of a motor and an air-water mixed cooling system.

The present disclosure will be further described with reference to the attached drawings.

As shown in FIGS. 1 to 7, a permanent magnet motor with a high-efficiency air-water mixed cooling system includes a motor body and a cooling system structure arranged on the motor body. The motor body includes a stator core 1, armature windings 2, a rotor core 3, a sheath 4, a permanent magnet 5, a rotating shaft 6, a casing 7 and a pair of bearings 9. The rotor core 3 is arranged on the rotating shaft 6, and the permanent magnet 5 is fixed on the surface of the rotor core 3 through binding, and the sheath 4 is fixed on the surface of the permanent magnet 5 through binding. The stator core 1 is fixed on the casing 7, and an air gap 11 is formed between the stator core 1 and the sheath 4. The end covers 8 are installed at both ends of the casing 7 and are closely attached to the casing 7 by fixed means.

Figure 3:
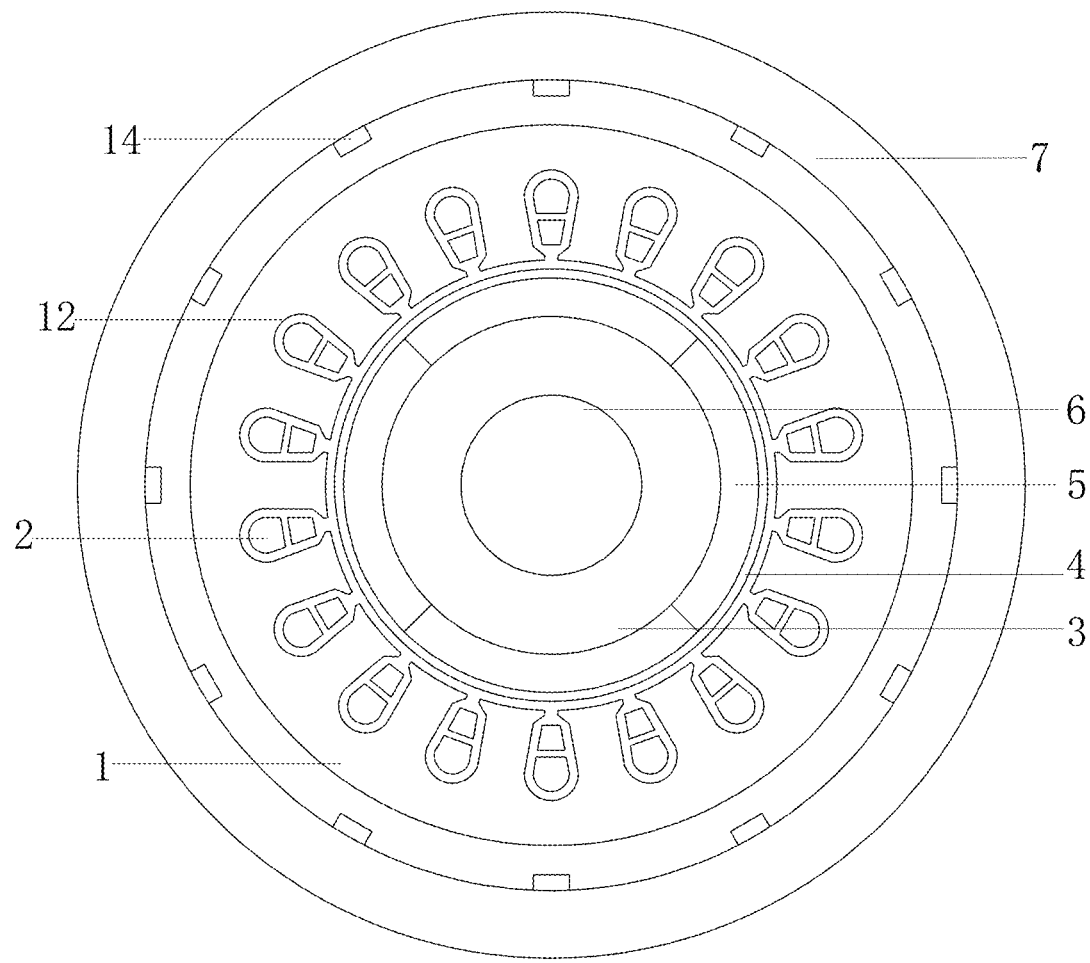
FIG. 3 is a radial sectional view of the motor and the air-water mixed cooling system.
Figure 4:
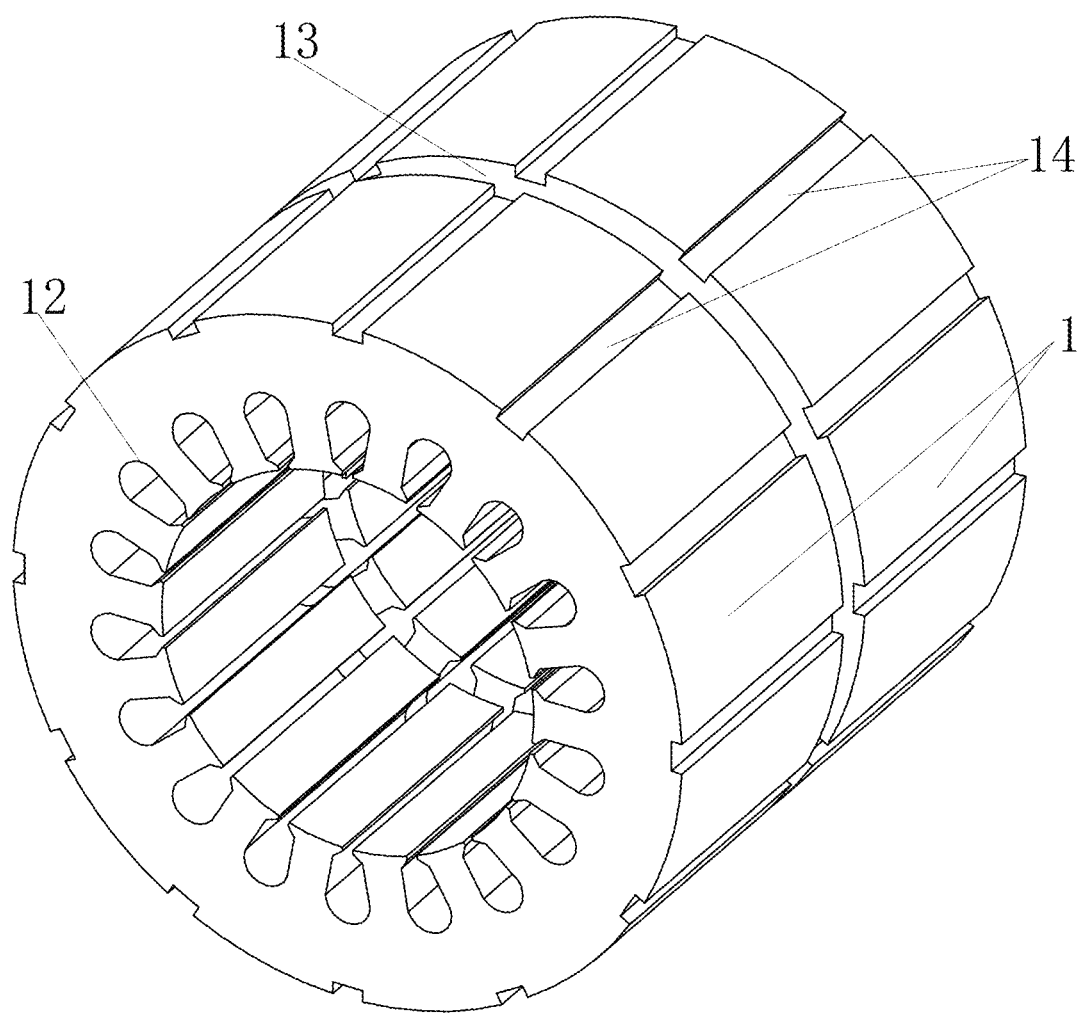
FIG. 4 is a three-dimensional structural diagram of a stator core.
Figure 5:
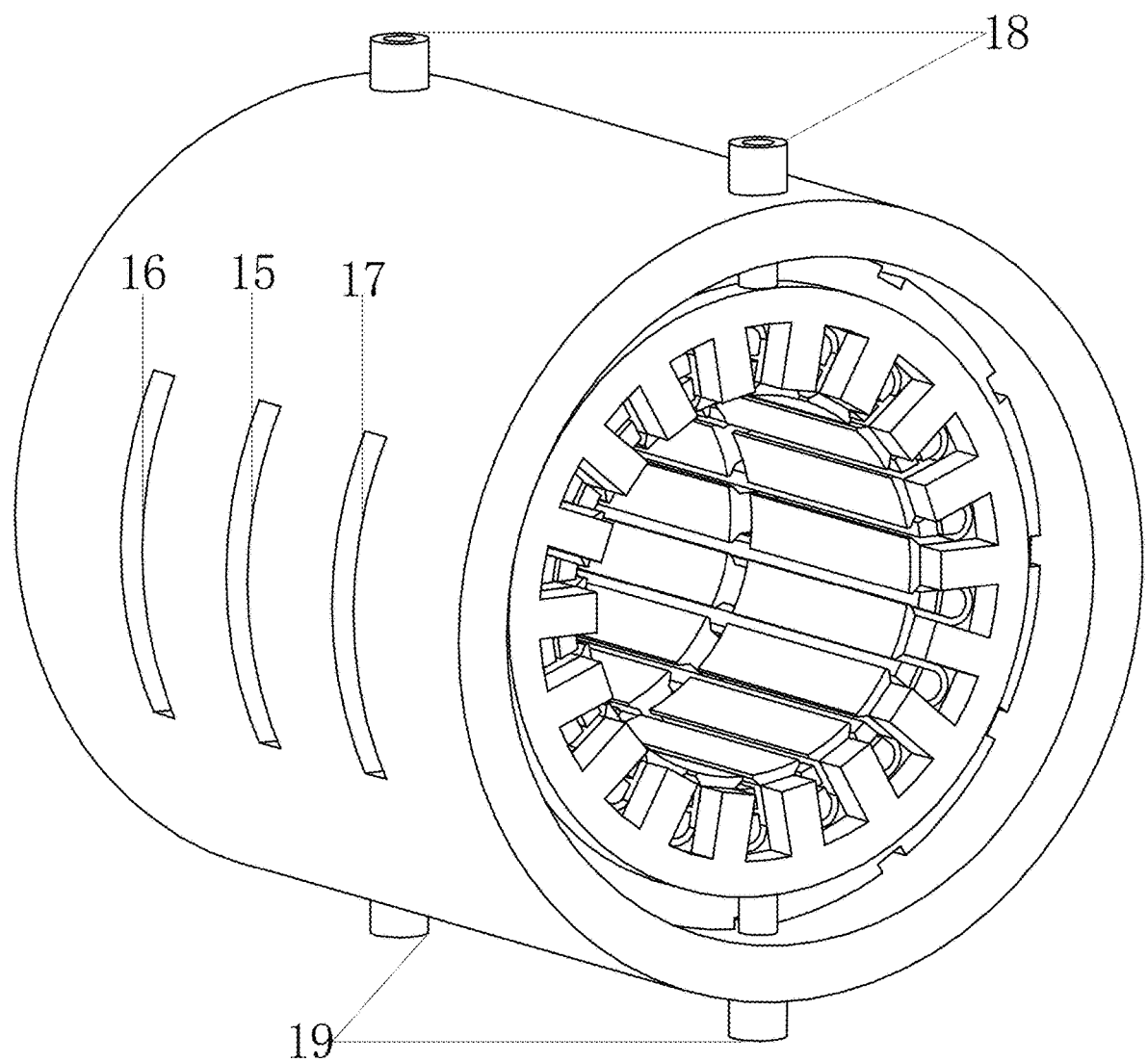
FIG. 5 is a three-dimensional structural diagram of an exterior of a casing.
Figure 6:
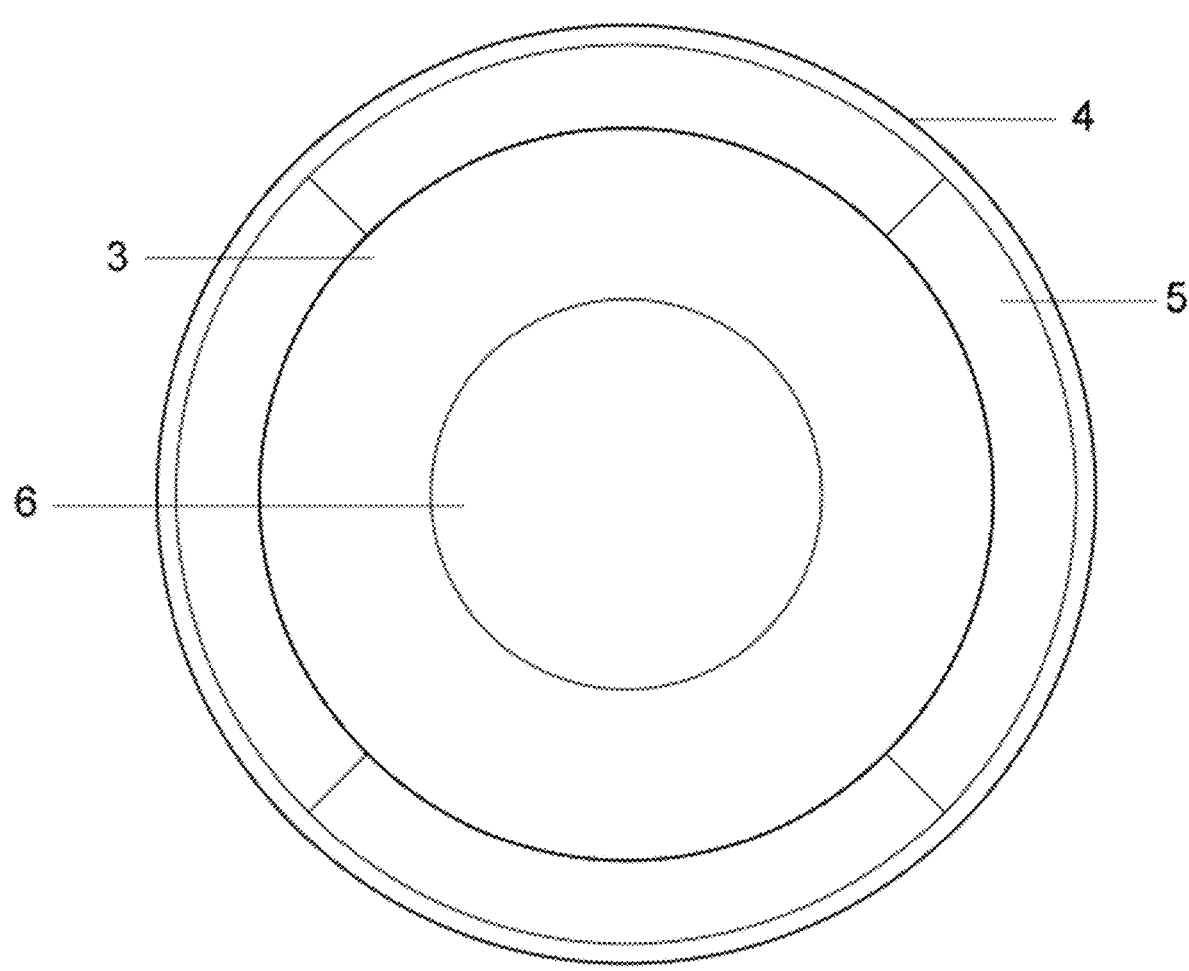
FIG. 6 is a radial sectional view of a rotor.
Figure 7:
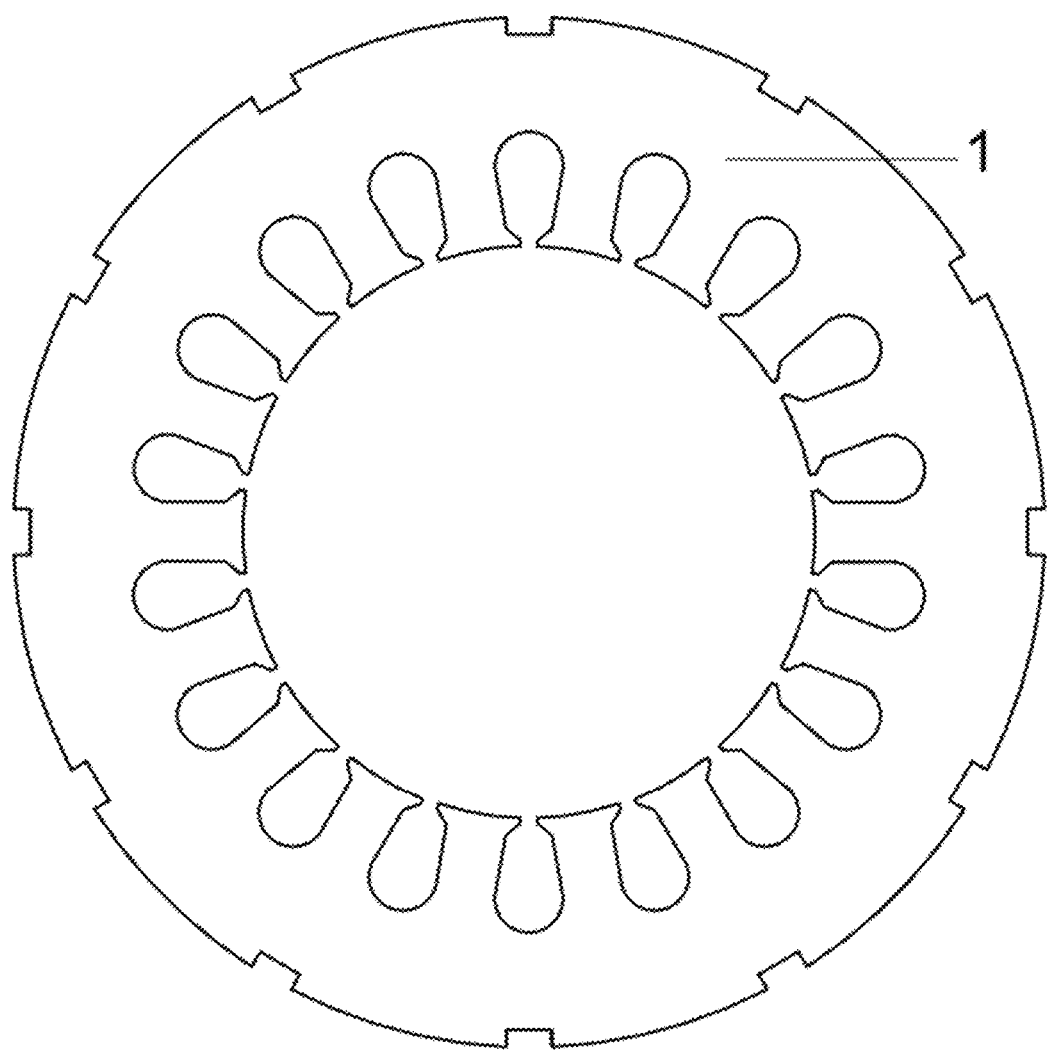
FIG. 7 is a radial sectional view of the stator core.

As shown in FIGS. 3 to 4 and FIG. 7, the inner circumference of the stator core 1 is provided with multiple stator slots 12 in the circumferential direction, the armature windings 2 are arranged in the stator slots 12 and are double-layer windings, and the outer circumference of the stator core 1 is provided with multiple axial ventilation channels 14 in the axial direction. The axial ventilation channels 14 are used for promoting cooling air in the motor to circulate. The outer circumference of the stator core 1 is provided with a radial ventilation channel 13 along a radial direction. The radial ventilation channel 13 is communicated with axial ventilation channels 14. The radial ventilation channel 13 contacts with the rotor core 3. In present disclosure, by arranging radial ventilation channel 13 and the axial ventilation channels 14 on the stator, the cooling air in the motor circulates smoother, so that all parts of the motor may better contact with the cooling air, and the flow velocity of the surface of all parts of the motor is accelerated, the heat exchange efficiency of the stator and the rotor are further greatly improved, and the cooling efficiency is higher.

The cooling air directly contacts the armature windings 2 in the ventilation channel through the radial ventilation channel 13 of stator, which accelerates the heat exchange between the armature windings 2 and the air, and at the same time, the axial holes in the armature windings 2 and the stator slots 12 also accelerate the heat exchange with air. Finally, the cooling air enters the end cavity of the motor through the air gap and the axial ventilation channel of the stator core 1, so that the flow velocity of air in end cavity of the motor during running increases and the air circulates continuously, which makes the initial temperature of the air in the end cavity reduced and the temperature rise of the windings reduced.

Figure 2:
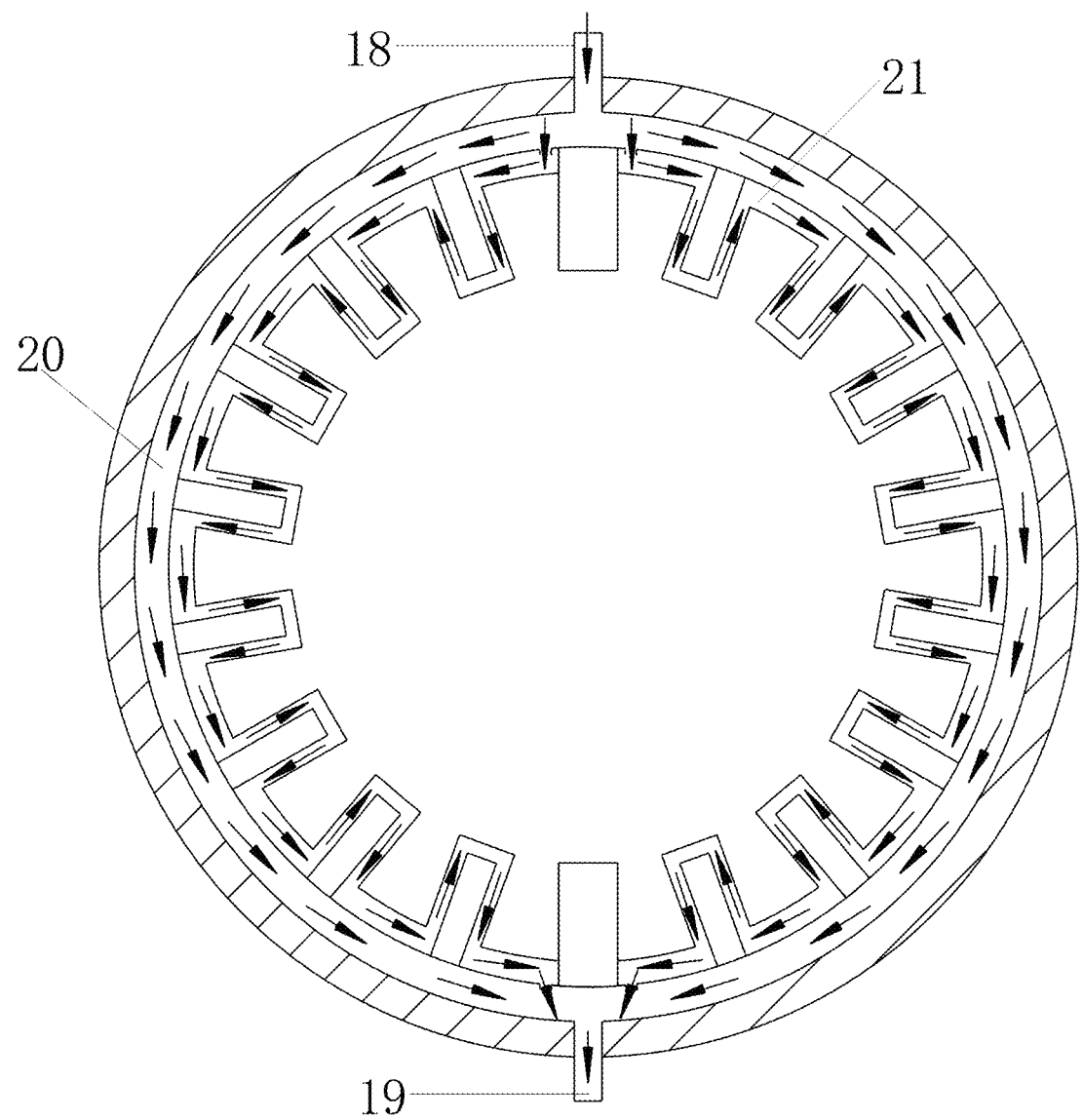
FIG. 2 is a cross-sectional view of stator water-cooling discs of the motor.

As shown in FIGS. 1 to 2, two ends of the stator core 1 are provided with stator water-cooling discs 10. The casing 7 is provided with an air inlet 15, multiple air outlets, casing water-cooled water inlets 18 and casing water-cooled water outlets 19. The air inlet 15 is communicated with the radial ventilation channel 13, and multiple air outlets are communicated with the axial ventilation channels 14. The casing water-cooled water inlets 18 and the casing water-cooled water outlets 19 are both communicated with the stator water-cooling discs 10.

As shown in FIG. 2, the stator water-cooling discs 10 are similar in size to the stator core 1 and installed on both sides of the stator core 1. Each of stator water-cooling discs 10 includes an annular structure 20 at outer side and warping pieces 21 arranged in a sequential array at inner side, and the warping pieces 21 correspond to the armature windings 2 one by one. An outer-ring water channel is opened inside the annular structure 20, and U-shaped inner-ring water channels, communicated with each other, are opened inside the warping pieces 21. A water inlet and a water outlet which are opposite are opened on an outer circumference of the annular structure 20. The water inlet and water outlet are communicated with and correspond to the casing water-cooled water inlets 18 and the casing water-cooled water outlets 19 of the casing 7, and the outer-ring water channel and the inner-ring water channels are respectively communicated at the casing water-cooled water inlets 18 and the casing water-cooled water outlets 19, and U-shaped inner-ring water channels are not opened inside the warping pieces 21 corresponding to the water inlet and the water outlet, so that the outer-ring water channel and the inner-ring water channels form a double parallel waterway structure, and the outer-ring water channel flows down along the two sides of the water inlet, and the cooling water of the inner-ring water channels 22 flows from top to bottom through the U-shaped openings. The stator water-cooling discs 10 are connected with an external circulating water cooling system. The external circulating water system connected with the water jacket of the stator water-cooling discs 10 provides a temperature far lower than the internal temperature of the motor and a certain flow rate of cooling water. Water pumped by an external water pump circulates through a casing water-cooled water inlet 18, a stator water-cooling discs 10 and a casing water-cooled water outlet 19 on the casing 7.

The ends of stator core 1 and armature windings 2 are in direct contact with stator water-cooling discs 10 on both sides. The stator core 1 and end windings transfer heat through the structure of stator water-cooling discs 10, and a lot of heat is taken away, and the other part of heat is taken away by the cooling air from radial ventilation channel 13 and axial ventilation channels 14. The air-water cooling design further cools stator core 1 and armature windings 2, while the rotor core 3 transfers heat with stator core 1 through air gap, which indirectly cools the rotor core 3. When the cooling air in the radial ventilation channel 13 collides with the surface of the rotor core 3 rotating at a high speed, the air speed becomes larger on the surface of the rotor core 3 due to the centrifugal force, which accelerates the air exchange between the internal air and the external fan air.

As shown in FIG. 1, in this embodiment, there are two air outlets, namely, a first air outlet 16 and a second air outlet 17. The first air outlet 16 and the second air outlet 17 are arranged on both sides of the air inlet 15, and the openings of the first air outlet 16 and the second air outlet 17 are the same size. In this structure, rectangular first air outlet 16 and rectangular second air outlet 17 with the same area are opened at the casing 7, which provides shorter circulation path than the traditional axial ventilation system and greatly enhances the air circulation inside the motor. The air inlet 15, the first air outlet 16 and the second air outlet 17 are all connected with an external blower. A dust filter net 20 is installed at the air inlet 15 of the casing ventilation channel to filter the dust caused by the external blower, so that the electromagnetic performance inside the motor is not affected by the dust caused by the blower, and the working stability inside the motor is enhanced.

The armature windings 2 pass through the radial ventilation channel 13 and are in direct contact with the cooling air. The armature winding 2 accounts for 65%-75% of the space in the stator slot 12, and the rest of the space is for the in-slot air channel. The in-slot air channel accounts for 25%-35% of the space in the stator slot. The in-slot air channels are communicated with the axial ventilation channels 14 through the air gap 11. The in-slot air channels may accelerate the flowing of air inside the motor, and also increases the convective heat dissipation coefficient on the surface of the motor components. The reason why the stator radial ventilation channels 13 are not opened on traditional air-cooling structure is that the use of this structure increases the consumption of the armature windings, which leads to the rise of the winding temperature. However, the structure of the stator water-cooling discs 10 used in air-water mixed cooling in the present disclosure may effectively cool the temperature rise generated by the windings, and the air channels in the stator slots 12 account for 25%-35%, which further inhibits the temperature rise of the windings 2.

Figure 8A:
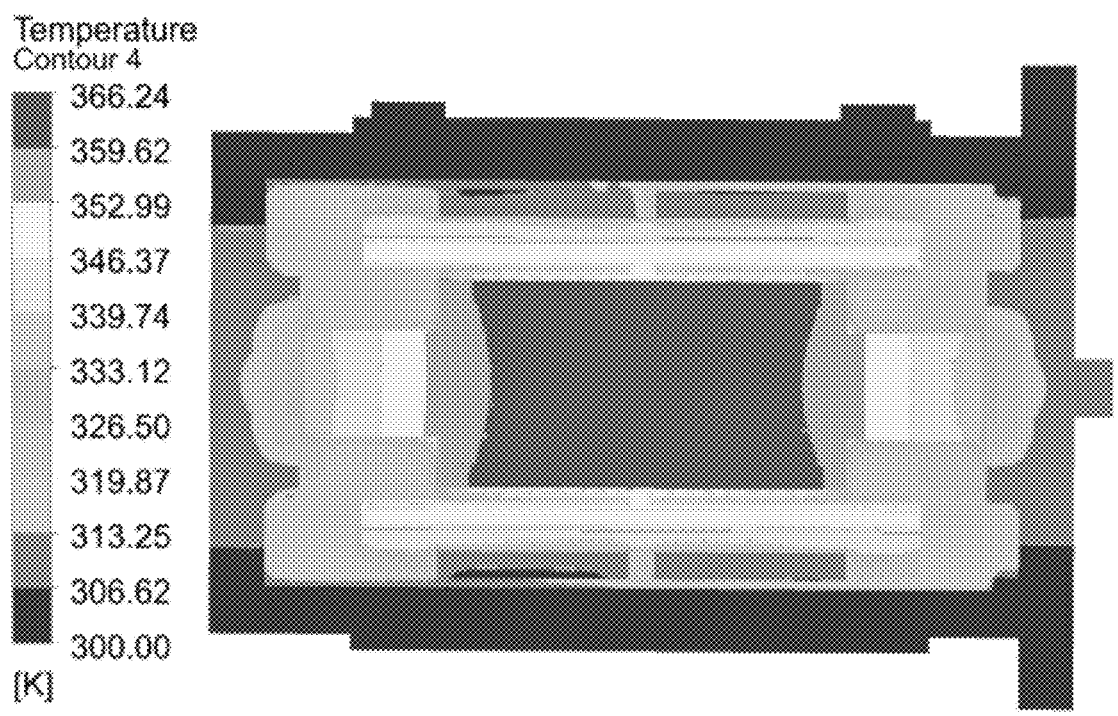
FIG. 8A is a cooling effect diagram of a motor with an air-water mixed cooling system according to the present disclosure.
Figure 8B:
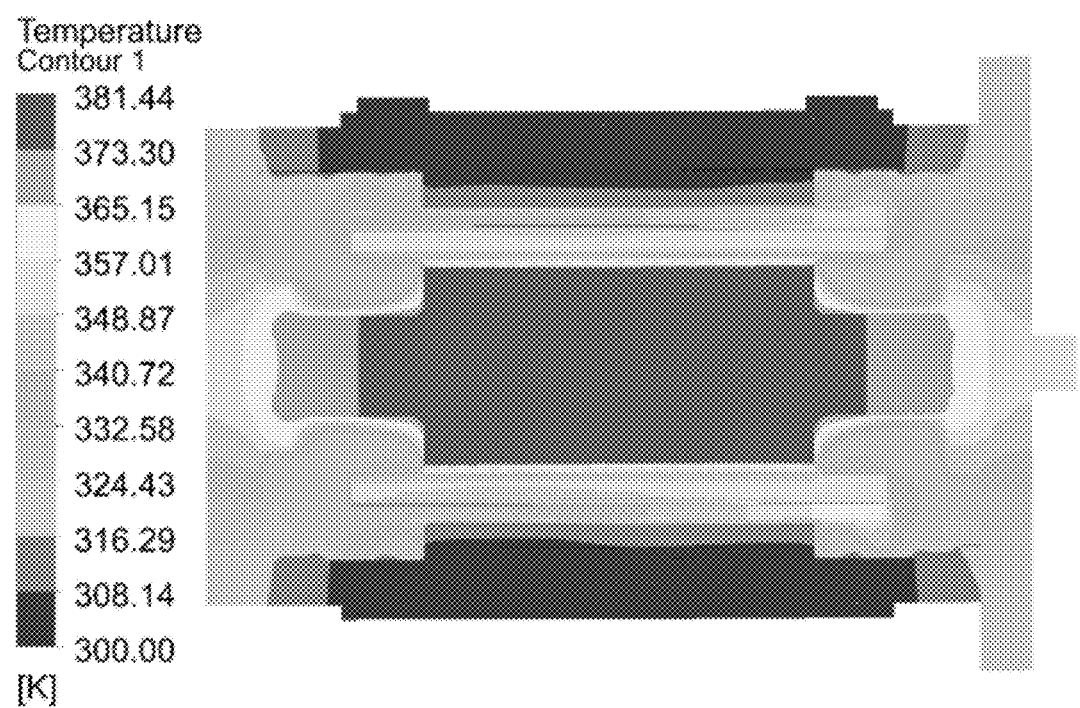
FIG. 8B is a cooling effect diagram of a motor with a casing water cooling structure, where the motor works in a same condition as shown in FIG. 8A.
Figure 9A:
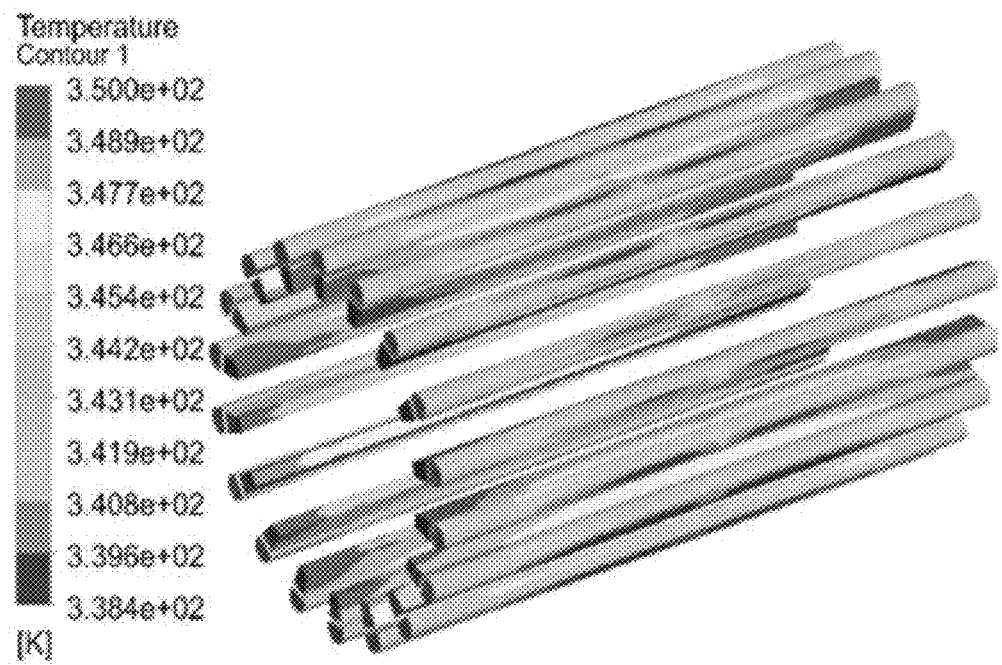
FIG. 9A is a cooling effect diagram of windings of the motor with the air-water mixed cooling system according to the present disclosure.
Figure 9B:
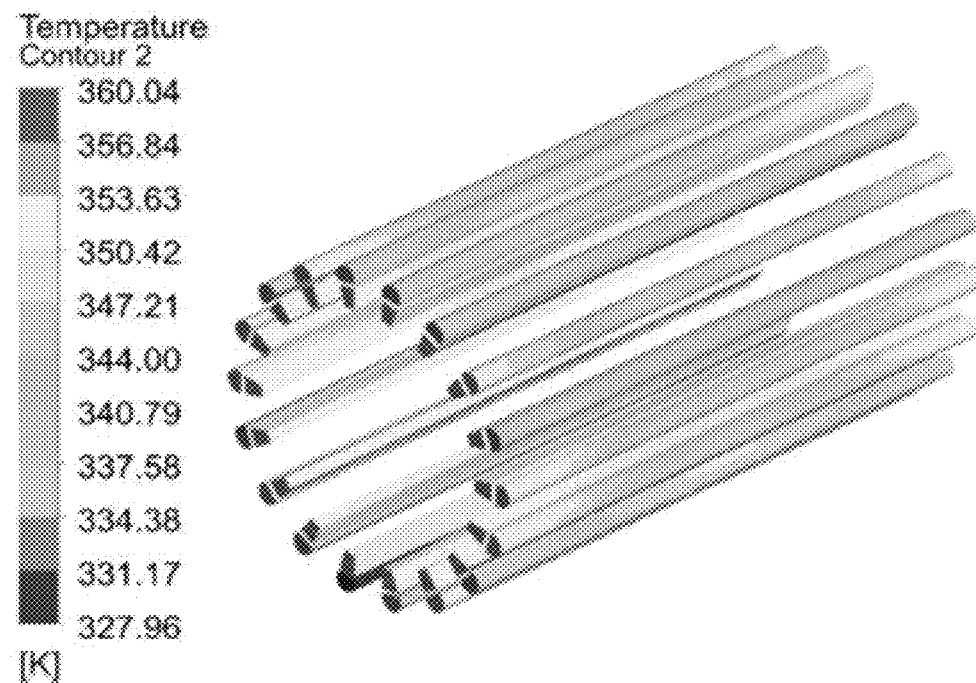
FIG. 9B is a cooling effect diagram of windings of the motor with the casing water cooling structure, where the motor works in the same condition as shown in FIG. 9A.

As shown in FIGS. 8A, 8B, 9A and 9B, a simulation experiment adopts the comparison of the temperature field between the traditional casing water cooling and the internal ventilation structure according to the present disclosure (mixed cooling structure) under the same water cooling condition. The simulation experiment is based on the calculation by commercial fluid field software Fluent. FIG. 8A shows the axial temperature distribution diagram of a motor with an air-water mixed cooling system according to the present disclosure. FIG. 8B shows the axial temperature distribution diagram of a motor with an casing water cooling structure, where the motor works as shown in FIG. 8A. FIG. 9A shows the winding cooling effect diagram of windings of the motor with the air-water mixed cooling system according to the present disclosure. FIG. 9B shows the winding cooling effect diagram of windings of the motor with the casing water cooling structure, where the motor works as shown in FIG. 9A. It can be seen that the maximum temperature rise by air-water mixed cooling is 18.72% lower than the maximum temperature by pure water cooling, and the maximum temperature rise of the winding by air-water mixed cooling is 20.08% lower than the maximum temperature of the winding by pure water cooling.

The air-water mixed cooling structure for permanent magnet motor with radial ventilation structure according to the disclosure, the heat generated by stator core 1 and armature windings 2 may be directly taken away by circulating cooling water in stator water-cooling discs 10, or by cooling air in radial ventilation channel 13 and stator core axial ventilation channels 14 of the stator core. The heat generated by the sheath 4 and the permanent magnet 5 may be transferred to the stator core 1 through the air gap 11, so that the heat is indirectly taken away, and the heat may also be directly taken away through the cooling air in the radial ventilation channel 13 of the stator core and the axial ventilation channels 14 of the stator core. In this embodiment, each component of the motor is cooled according to the principle of high-efficiency air-water mixed cooling.

What is claimed is:

1. A permanent magnet motor with an air and water mixed cooling system, wherein the permanent magnet motor comprises a stator core, armature windings, a rotor core, a sheath, a permanent magnet, a rotating shaft and a casing, wherein the rotor core is arranged on the rotating shaft, the permanent magnet is fixed on a surface of the rotor core, the sheath is fixed on a surface of the permanent magnet, the stator core is fixed on the casing, an air gap is formed between the stator core and the sheath, and end covers are installed at both ends of the casing and are closely attached to the casing;

an inner circumference of the stator core is provided with a plurality of stator slots along a circumferential direction, the armature windings are arranged in the stator slots, an outer circumference of the stator core is provided with a plurality of axial ventilation channels along an axial direction, and the outer circumference of the stator core is provided with a radial ventilation channel along a radial direction, the radial ventilation channel is communicated with the axial ventilation channels, and the radial ventilation channel is in contact with the rotor core, and stator water-cooling discs are arranged at both ends of the stator core; the casing is provided with an air inlet, a plurality of air outlets, casing water-cooled water inlets and casing water-cooled water outlets, the air inlet is communicated with the radial ventilation channel, and the plurality of air outlets are communicated with the axial ventilation channels, and the casing water-cooled water inlets and the casing water-cooled water outlets are both communicated with the stator water-cooling discs;

each of the stator water-cooling discs comprises an annular structure at an outer side and warping pieces arranged in a sequential array at an inner side, and the warping pieces correspond to the armature windings one by one, an outer-ring water channel is opened inside the annular structure, and U-shaped inner-ring water channels, communicated with each other, are opened inside the warping pieces, and a water inlet and a water outlet being opposite are opened on an outer circumference of the annular structure, the water inlet and the water outlet are communicated with and correspond to the casing water-cooled water inlets and the casing water-cooled water outlets of the casing, the outer-ring water channel and the inner-ring water channels are respectively communicated at the casing water-cooled water inlets and the casing water-cooled water outlets, U-shaped inner-ring water channels are not opened inside the warping pieces corresponding to the water inlet and the water outlet, the outer-ring water channel and the inner-ring water channels form a double parallel waterway structure;

each of the armature windings accounts for 65% to 75% of a space in each of the stator slots, and a rest of the space is for each of in-slot air channels, each of the in-slot air channels accounts for 25% to 35% of the space, and the in-slot air channels are communicated with the axial ventilation channels through the air gap.

2. The permanent magnet motor with the air and water mixed cooling system according to claim 1, wherein the armature windings are double-layer windings.

3. The permanent magnet motor with the air and water mixed cooling system according to claim 1, wherein the stator water-cooling discs are connected with an external circulating water-cooling system.

4. The permanent magnet motor with the air and water mixed cooling system according to claim 1, wherein the air inlet and the air outlets are both connected with an external blower, and a dust filter net is installed at the air inlet of the radial ventilation channel of the casing.

5. The permanent magnet motor with the air and water mixed cooling system according to claim 1, wherein two air outlets are provided, and are a first air outlet and a second air outlet respectively, the first air outlet and the second air outlet are arranged on both sides of the air inlet, and sizes of openings of the first air outlet and the second air outlet are the same.

* * * * *